US012787939B2

(12) United States Patent
Afting et al.
(10) Patent No.: US 12,787,939 B2
(45) Date of Patent: Nov. 10, 2026

(54) METHOD FOR ADJUSTING HAYMAKING MACHINE INTO TRANSPORT POSITION

(71) Applicant: Maschinenfabrik Bernard Krone GmbH & Co. KG, Spelle (DE)

(72) Inventors: Andreas Afting, Emsbüren (DE); Philip Hermes, Spelle (DE); Simon Speller, Hopsten (DE)

(73) Assignee: Maschinenfabrik Bernard Krone GmbH & Co. KG, Spelle (DE)

( * ) Notice: Subject to any disclaimer, the term of this patent is extended or adjusted under 35 U.S.C. 154(b) by 403 days.

(21) Appl. No.: 18/502,596

(22) Filed: Nov. 6, 2023

(65) Prior Publication Data

US 2024/0147907 A1 May 9, 2024

(30) Foreign Application Priority Data

Nov. 9, 2022 (DE) ........................ 102022129615.6

(51) Int. Cl.
*A01D 78/14* (2006.01)
*A01D 89/00* (2006.01)

(52) U.S. Cl.
CPC ......... *A01D 78/144* (2013.01); *A01D 89/001* (2013.01)

(58) Field of Classification Search
CPC .............. A01D 78/144; A01D 78/1014; A01D 78/1028; A01D 78/1007; A01D 80/005;
(Continued)

(56) References Cited

U.S. PATENT DOCUMENTS 2,995,385 A * 8/1961 Lohrman .............. A01B 63/22
280/412
3,536,144 A * 10/1970 Hood .................. A01B 73/044
172/311
(Continued)

FOREIGN PATENT DOCUMENTS

DE 10011730 A1 * 9/2001 .......... A01D 34/661
EP 1525786 A1 * 4/2005 ........ A01D 78/1007
(Continued)

*Primary Examiner* — Christopher J Sebesta
*Assistant Examiner* — Sunny D Webb
(74) *Attorney, Agent, or Firm* — McKee, Voorhees & Sease, PLC

(57) ABSTRACT

The invention relates to a method for adjusting a haymaking machine (1) into a transport position, which haymaking machine (1) has a main frame (2) and two side units (6) arranged to both sides on the main frame (2), each side unit having a boom (7), which in a side position extends sidewards along a transverse axis (Y) from an attachment region (3) of the main frame (2), and a cultivating unit (20), arranged on the boom (7), for field cultivation, said cultivating unit (20) being adjustable on the boom (7) between an inner position arranged relatively close to the attachment region (3) and an outer position that is further remote from the attachment region (3). According to the invention, in order to propose improved adjustability for transport in the case of a haymaking machine having booms, provision is made whereby, proceeding from a working position in which the booms (7) are in the side position, the following steps are performed:

adjustment of each cultivating unit (20) relative to the main frame (2) into an upright position, at least in part by pivoting about in each case one unit pivot axis (A) which, when the booms (7) are in the side position, extends at least predominantly along the transverse axis (Y), adjustment of the booms (7) relative to the main frame (2), at least in part by pivoting about in each case one boom pivot axis (B), which extends at least predominantly along a vertical axis (Z) and is arranged in the attachment region (3), towards the longitudinal axis (X) into a longitudinal position, wherein the adjustment of the booms (7) is performed while the cultivating units (20) are at least temporarily in the outer position, and adjustment of the cultivating units (20) into the inner position after the adjustment of the booms (7) has been at least performed at least partially.

15 Claims, 8 Drawing Sheets

(58) Field of Classification Search
CPC .... A01D 84/00; A01D 89/001; A01D 89/004; A01D 89/008; A01B 63/10; A01B 73/02; A01B 73/04; A01B 73/06; A01B 73/065
USPC ......... 56/192, 370, 377, DIG. 21, 228, 15.5; 172/311, 456, 662, 452
See application file for complete search history.

(56) References Cited

U.S. PATENT DOCUMENTS

| | | | | | |
|---|---|---|---|---|---|
| 4,576,238 | A * | 3/1986 | Spencer | A01B 73/065 | 172/311 |
| 5,232,054 | A * | 8/1993 | Van Blaricon | A01B 73/065 | 280/412 |
| 6,238,170 | B1 * | 5/2001 | Pingry | A01B 73/005 | 414/703 |
| 7,581,597 | B2 * | 9/2009 | Neudorf | A01B 73/067 | 172/1 |
| 9,986,672 | B2 * | 6/2018 | Smyth | A01B 29/06 | |
| 9,986,676 | B2 * | 6/2018 | Speer | A01B 59/042 | |
| 10,076,071 | B2 * | 9/2018 | Schwer | A01B 63/32 | |
| 10,448,573 | B1 | 10/2019 | Bellamy et al. | | |
| 2006/0254244 | A1 | 11/2006 | Geiser | | |
| 2015/0020492 | A1 | 1/2015 | Schwer et al. | | |
| 2023/0105332 | A1 * | 4/2023 | Sivinski | A01B 63/32 | 172/1 |

FOREIGN PATENT DOCUMENTS

| | | | | | |
|---|---|---|---|---|---|
| EP | 1859665 | A1 | * | 11/2007 | A01B 73/06 |
| EP | 2042023 | A1 | * | 4/2009 | A01D 57/20 |
| EP | 2979529 | A1 | * | 2/2016 | A01B 73/048 |
| EP | 3888447 | B1 | * | 8/2023 | A01D 84/00 |
| HU | 0104703 | A2 | * | 5/2002 | A01B 73/065 |
| WO | WO-2011112077 | A1 | * | 9/2011 | A01D 78/1007 |

* cited by examiner

METHOD FOR ADJUSTING HAYMAKING MACHINE INTO TRANSPORT POSITION

CROSS REFERENCE TO RELATED APPLICATIONS

This application claims priority under 35 U.S.C. § 119 to German Patent Application DE 10 2022 129615.6, filed Nov. 9, 2022, which is herein incorporated by reference in its entirety, including without limitation, the specification, claims, and abstract, as well as any figures, tables, appendices, or drawings thereof.

FIELD OF THE INVENTION

The present invention relates to a method for adjusting a haymaking machine into a transport position.

BACKGROUND OF THE INVENTION

The background description provided herein gives context for the present disclosure. Work of the presently named inventors and aspects of the description that may not otherwise qualify as prior art at the time of filing are neither expressly nor impliedly admitted as prior art.

In agriculture, windrowers are used to collect crops that are lying on the ground, such as grass, alfalfa, legumes, or hay, into windrows. This may be performed, for example, in order to better protect the crops against moisture or in order to prepare them for subsequently being picked up by a baler, a loader wagon, or the like. In general, the windrower conveys the crops to one side or to the middle, whereby a windrow is created. One form of windrower provides a main frame on which two booms, each having a windrower unit, are arranged. An optimum working width is achieved by way of the laterally extending booms. In this form, however, the windrower is not suitable for transport, in particular for road transport. One solution to this problem consists of adjusting the windrower into a transport position, which generally involves an adjustment of the booms. For example, it is known in the prior art to pivot the booms upwards about pivot axes extending in a longitudinal direction. A small width for transport can thus be realized, but the booms with the windrower units project upwards to a relatively great height, which can have an adverse effect, for example, during cornering maneuvers. Under some circumstances, it is hereby also difficult to comply with road traffic legal regulations. Furthermore, a high torque or high power is required to raise the booms with the windrower units. Aside from the case of windrowers, similar problems also arise with other haymaking machines that have corresponding booms with cultivating units arranged thereon.

Therefore, there is a strong need for improved adjustability for transport in the case of a haymaking machine having booms.

SUMMARY OF THE INVENTION

The following objects, features, advantages, aspects, and/or embodiments are not exhaustive and do not limit the overall disclosure. No single embodiment needs to provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

An aspect of the invention is a method for adjusting a haymaking machine into a transport position, which haymaking machine has a main frame and two side units arranged to both sides on the main frame, each side unit having a boom, which in a side position extends sidewards along a transverse axis from an attachment region of the main frame, and a cultivating unit, arranged on the boom, for field cultivation, said cultivating unit being adjustable on the boom between an inner position arranged relatively close to the attachment region and an outer position that is further remote from the attachment region, wherein, proceeding from a working position in which the booms are in the side position, the following steps are performed that include adjustment of each cultivating unit relative to the main frame into an upright position, at least in part by pivoting about in each case one unit pivot axis which, when the booms are in the side position, extends at least predominantly along the transverse axis, adjustment of the booms relative to the main frame, at least in part by pivoting about in each case one boom pivot axis, which extends at least predominantly along a vertical axis and is arranged in the attachment region, towards the longitudinal axis into a longitudinal position, wherein the adjustment of the booms is performed while the cultivating units are at least temporarily in the outer position, and adjustment of the cultivating units into the inner position after the adjustment of the booms has been at least performed at least partially.

Another aspect of the invention is a haymaking machine that has a main frame and two side units arranged to both sides on the main frame, each side unit having a boom, which in a side position extends sidewards along a transverse axis from an attachment region of the main frame, and a cultivating unit, arranged on the boom, for field cultivation, said cultivating unit being adjustable on the boom between an inner position arranged relatively close to the attachment region and an outer position that is further remote from the attachment region, wherein the haymaking machine is configured to carry out the following steps, proceeding from a working position in which the booms are in the side position with adjustment of each cultivating unit relative to the main frame into an upright position, at least in part by pivoting about in each case one unit pivot axis which, when the booms are in the side position, extends at least predominantly along the transverse axis, adjustment of the booms relative to the main frame, at least in part by pivoting about in each case one boom pivot axis, which extends at least predominantly along a vertical axis and is arranged in the attachment region, towards the longitudinal axis into a longitudinal position, wherein the adjustment of the booms is performed while the cultivating units are at least temporarily in the outer position, and adjustment of the cultivating units into the inner position after the adjustment of the booms has been at least performed at least partially.

For this purpose, a method for adjusting a haymaking machine into a transport position is provided, which haymaking machine has a main frame and two side units arranged to both sides on the main frame, each side unit having a boom, which in a side position extends sidewards along a transverse axis from an attachment region of the main frame, and a cultivating unit, arranged on the boom, for field cultivation, said cultivating unit being adjustable on the boom between an inner position arranged relatively close to the attachment region and an outer position that is further remote from the attachment region.

The haymaking machine serves in the broadest sense for rearranging crops that are lying on the ground, in particular, hay, grass, alfalfa, etc.; that is to say, the possible uses of said haymaking machine are expressly not limited to hay. The crops are at least briefly taken in, moved, and deposited on the ground again at a different location and/or in a different arrangement. The term "haymaking machine" refers here, in particular, to windrowers and to tedders. The haymaking machine may, for example, be designed as an agricultural machine with its own running gear. It may have its own traction drive, or may be provided for being towed by a tractor. It may, however, also be designed as a mounted implement that is supported on the front or rear of a tractor or the like and which does not have a running gear that would be configured to permanently support its weight.

The method serves for adjusting the haymaking machine into a transport position. This is the position in which the haymaking machine is arranged for transport to the location of use or for return transport from the location of use. This can also be referred to as a transport configuration.

The haymaking machine has a main frame. This main frame may, as it were, form the central element of the haymaking machine and be primarily responsible for its structural stability. It is normally of inherently rigid design, though it may consist of multiple interconnected components. In the operating state, the main frame may be supportable by means of a running gear, which is either arranged on the main frame or is part of an agricultural machine to which the haymaking machine is coupled (for example, as a mounted implement). At least part of the weight of the haymaking machine can be accommodated, and supported on the ground, via the main frame and the running gear. The main frame may furthermore be designed for at least indirect connection to a tractor, wherein a drawbar that is used for this purpose can be regarded as part of the main frame. Alternatively, the main frame may have structures for connection to an agricultural machine, which structures allow use as a mounted implement.

Side units are arranged to both sides on the main frame, each side unit having a boom, which in a side position extends sidewards along a transverse axis from an attachment region of the main frame, and a cultivating unit, arranged on the boom, for field cultivation. The expression "to both sides" refers to the arrangement transversely with respect to the direction of travel, that is to say, one of the side units is arranged on one side of the main frame (for example, "left"), whilst the other is arranged on the other side (for example "right"). Each side unit has a boom, which can also be referred to as a boom arm. A cultivating unit is arranged on the boom. In the operating state, the weight of the cultivating unit is accommodated at least partially, under some circumstances even completely, by the boom, and is transmitted to the main frame. Since the boom must, therefore, support its own weight and at least part of the weight of the cultivating unit, said boom is of correspondingly stable design. The boom is connected to an attachment region of the main frame. In a side position, which is commonly adopted during field cultivation work, the boom extends sidewards along a transverse axis from the attachment region. Here and below, "extending along an axis" means that the corresponding element has an extent, under some circumstances its greatest extent, in the direction of said axis. It does not generally mean that the element (in this case, the boom) runs parallel to the axis (in this case, the transverse axis), although this is possible. Here, the transverse axis runs horizontally and transversely with respect to the direction of travel. The boom may be at least partially of straight form. It may run at least partially parallel to the transverse axis when in the side position. Normally, each boom is assigned a dedicated attachment region. Refinements are conceivable in which the boom extends to both sides from the attachment region. The cultivating unit arranged on the boom is connected to the boom at a distance from the attachment region, wherein said cultivating unit is positionable to the side of the main frame with respect to the transverse axis. The cultivating unit serves for field cultivation work, which refers in particular to the aforementioned rearrangement of crops that are lying on the ground. In particular, the extent of the cultivating unit along the transverse axis may be greater than that along the longitudinal axis and/or along the vertical axis, in each case with regard to its arrangement during field cultivation work. That is to say; in this case, the cultivating unit can be referred to as being "wide". As already mentioned above, the haymaking machine may be designed as a windrower or as a tedder. Each cultivating unit is designed, in the former case, as a windrower unit and, in the latter case, as a tedder unit.

The cultivating unit is adjustable on the boom between an inner position arranged relatively close to the attachment region and an outer position that is further remote from the attachment region. The cultivating unit may be adjusted between the inner position and the outer position, in particular by rectilinear translation along a movement axis or sliding axis. With regard to the working position, said sliding axis preferably runs at least predominantly along the transverse axis. More specifically, the sliding axis may run at an angle of less than 30° with respect to the transverse axis. In this context, the "inner position" and the "outer position" need not necessarily correspond to the innermost position and the outermost position that can be adopted. That is to say, it is not necessary to utilize the entire range of movement. The adjustability of each cultivating unit between the inner position and the outer position may be used, during field cultivation work, for cultivating different regions relative to the main frame.

In the method according to the invention, proceeding from a working position in which the booms are in the side position, at least two steps described below are performed. This expressly does not rule out further steps being performed before, during, and/or after the steps stated. Here, the working position is a position of the haymaking machine that is normally adopted on the field that is to be cultivated. It may, in particular, be a position that is assumed during the field cultivation work itself, though it could, for example, also be a position in which at least one cultivating unit is raised for the purposes of traveling across a headland.

In one method step, each cultivating unit is adjusted relative to the main frame into an upright position, at least in part, by pivoting about, in each case, one unit pivot axis which, when the booms are in the side position, extends at least predominantly along the transverse axis. The adjustment of the cultivating unit may consist exclusively in the pivoting movement about the unit pivot axis. It may, however, also consist in a combined movement which, aside from the aforementioned pivoting movement about the unit pivot axis, also includes a pivoting movement about another pivot axis and/or a translational adjustment. Each unit pivot axis may, in particular, run parallel to the transverse axis. Normally, each unit pivot axis runs at an angle of less than 30° with respect to the transverse axis. An upward pivoting movement about the unit pivot axis, that is to say, a pivoting movement by which the pivot point of the cultivating unit is moved upwards with respect to a vertical axis, is preferably performed. The term "upright position" is used generally merely for designation purposes and is not to be interpreted in a limiting sense. In many cases, however, an upward pivoting movement occurs, by which the cultivating unit is, as it were, set upright. However, in particular in the case of a wide cultivating unit, the greatest dimension of which is in the direction of the transverse axis, a pivoting movement about the unit pivot axis that runs approximately in the direction of the transverse axis leads only to a relatively small shift of the center of gravity. Also, in this case, the torque required for the shift is less than that, for example, in the case of a pivoting movement about the longitudinal axis.

In a further step, the booms are adjusted relative to the main frame, at least in part, by pivoting about, in each case, one boom pivot axis, which extends at least predominantly along a vertical axis and is arranged in the attachment region, towards the longitudinal axis into a longitudinal position, wherein the adjustment of the booms is performed while the cultivating units are at least temporarily in the outer position. The adjustment of the booms may, in turn, consist, in particular exclusively, in a pivoting movement about the boom pivot axis. It may, however, also involve a combined rotational or rotational-translational movement. Each boom pivot axis may run parallel to the vertical axis. Normally, each boom pivot axis runs at an angle of less than 30° with respect to the vertical axis. The pivoting movement of the booms thus runs predominantly or even entirely in the horizontal plane. This may be advantageous insofar as the distance from the ground does not change or scarcely changes, and there is, therefore, no risk of contact being made with the ground. Furthermore, no raising work or only a little raising work has to be done during the adjustment of the booms. However, a certain inclination of the boom pivot axis with respect to the vertical axis may be advantageous. For example, in the case of an inclination towards the longitudinal axis, it can be achieved that the pivoting movement results in the center of gravity of the side units—and thus that of the haymaking machine as a whole—being shifted downwards, which is advantageous for the transport position. The adjustment of the booms into the longitudinal position normally includes a pivoting movement through an angle of between 80° and 100°, although embodiments are conceivable in which the angle is smaller or even greater. The lateral adjustability of the cultivating units is utilized to make the adjustment operation more efficient. In general, the pivoting of the booms can be performed more effectively if the cultivating units are at the greatest possible distance from the attachment region. In this way, a collision of the cultivating unit with the main frame and/or with the other cultivating unit can be most easily avoided. Accordingly, during the adjustment of the booms, the cultivating units are arranged in the outer position at least temporarily, and optionally also throughout the adjustment.

Whilst the booms extend sidewards when in the side position, resulting in a considerable width of the haymaking machine, they extend predominantly in the longitudinal direction when in the longitudinal position, whereby the width of the haymaking machine is significantly reduced. Here, the adjustment of the cultivating units can be highly conducive to enabling the booms to be pivoted closer to the frame and/or to one another without the cultivating units colliding.

In a further method step, the cultivating units are adjusted into the inner position after the adjustment of the booms has been performed at least partially. Whilst the outer position of the cultivating units promotes the pivoting of the booms, it is unfavorable for the purposes of further transport insofar as the weight of the cultivating unit exerts a high torque on the boom. Furthermore, a weight acting at a great distance from the attachment region also gives rise, under some circumstances, to a greater load on the main frame, or to a destabilization of the haymaking machine during transport. In the embodiments in which the haymaking machine has a dedicated running gear, this is normally arranged in the vicinity of the attachment region. From this aspect, too, it is expedient for the center of gravity of the cultivating unit to be arranged as close as possible to the attachment region for the purposes of transport. The adjustment of the cultivating units into the inner position may be performed in particular after the booms have been adjusted into the longitudinal position. These adjustments may, however, at least partially also overlap with one another in terms of time.

The scope of the invention does not rule out at least one method step being performed manually. Preferably, however, the aforementioned adjustment operations, and further adjustment operations that are yet to be mentioned, are performed by actuator means.

The three stated method steps may be performed in succession. It is, however, not ruled out that they partially overlap with one another in terms of time. In some embodiments, the execution of the steps alone may result in the transport position being attained, though it is also possible for at least one further step to additionally be performed. In any case, by way of two adjustment operations that consist, at least in part, in pivoting movements with a relatively small vertical shift of a center of gravity, a space-saving arrangement of the booms and of the cultivating units is made possible. Normally, the described pivoting movements do not require an excessively high torque, and therefore do not require exceptionally powerful actuators. Finally, by way of a third adjustment operation, which normally corresponds to a purely translational movement, a better arrangement of the center of gravity of the side units is achieved. As already mentioned above, the adjustment of the cultivating units and the adjustment of the booms may overlap with one another in terms of time. In one embodiment, however, the cultivating units are adjusted into the upright position before the booms are adjusted into the longitudinal position. Such a separation of the adjustment operations in terms of time may be advantageous from a control aspect. Furthermore, under some circumstances, it is advantageous if the actuator powers required for the two adjustment operations are required successively and not simultaneously.

It is conceivable for the booms to be pivoted rearwards into the longitudinal position, for example, if the haymaking machine is arranged as a mounted implement on a rear side of an agricultural machine. Another preferred embodiment, however, provides for the booms to be pivoted forwards with respect to a direction of travel. That is to say, the adjustment of the booms includes a forward pivoting movement towards the longitudinal axis.

In particular, the main frame may have a drawbar which extends forwards relative to the attachment region with respect to the longitudinal axis and towards which the booms are pivoted into the longitudinal position. The drawbar serves for coupling to a tractor, and at a front side has a corresponding receptacle or coupling for connecting to the tractor. Said drawbar may be rigidly connected to the main frame, and can also be regarded as part of said main frame. During the adjustment of the booms, these are pivoted forwards and thus approach the drawbar from both sides. It is advantageously the case that, in the transport position, the drawbar projects forwards beyond the side units, such that the risk of a collision between a side unit and the tractor is minimized.

The method preferably includes the cultivating units being adjusted into the outer position before the adjustment of the booms. This normally means that the cultivating units remain in the outer position throughout the adjustment of the booms. Said cultivating units are, however, in the outer position, at least at the start of the adjustment of the booms. This may be necessary, depending on the geometry of the side units and of the main frame, in order to avoid an aforementioned collision. It may also be advantageous from a control aspect and from a power aspect for the adjustment of the cultivating units and the adjustment of the booms to be performed successively.

In general, each cultivating unit is adjusted relative to the main frame, and this could also be implemented by way of an adjustment of the relevant boom. For example, the boom, together with the cultivating unit, could be pivotable about the unit pivot axis. This would, however, mean that the boom would have to perform at least two different pivoting movements, which is mechanically generally difficult to implement. It is, therefore, preferable for each cultivating unit to be adjusted relative to the boom into the upright position. That is to say; the cultivating unit is connected adjustably to the boom so as to allow the adjustment into the upright position. In particular, said cultivating unit may be connected to the boom pivotably about the unit pivot axis.

In one refinement, the cultivating unit is connected at least indirectly to the boom via a middle link and two side links which are laterally offset relative to said middle link along the transverse axis and which are at least partially vertically offset relative to said middle link along the vertical axis, wherein the middle link and the side links are mutually independently pivotably connected on both sides, and wherein, before the cultivating unit is adjusted into the upright position, the cultivating unit is, at least in part, adjusted upwards relative to the boom from a lowered position into a raised position by adjustment of at least one of the links. Said links are either connected directly to the boom or are connected to an interposed component (for example, a suspension frame, which will be described further below) that is connected to the boom. Each of the links is connected, so as to be pivotable independently of the other two links, to the cultivating unit and to the boom or to the interposed component. The side links are arranged to both sides of the middle link, and are at least partially offset relative to said middle link with respect to the vertical axis. Said side links are thus arranged either at least partially above or at least partially below the middle link. In the latter case, the middle link can be referred to as an upper link, and the side links can be referred to as lower links. Depending on the refinement, said lower links may be arranged entirely below the upper link, at least in the working position. Correspondingly, a refinement is also conceivable in which the side links are arranged entirely above the middle link. If the side links are designed as lower links, they may attach to the underside of the cultivating unit. The middle link is preferably adjustable in length by actuator means, and may have a linear actuator, for example, a hydraulic cylinder. The corresponding actuator is referred to here as middle link actuator or upper link actuator, in particular middle link cylinder or upper link cylinder. The side links are preferably pivotable by actuator means, for which purpose, in each case, one linear actuator may be attached to a side link and to the side of the main frame. These linear actuators, too, may be designed as hydraulic cylinders. They will hereinafter be referred to as side link actuators or lower link actuators, or specifically as side link cylinders or a lower link cylinders. The middle link actuator can be utilized for fine adjustment of a working height of the cultivating unit and/or for raising the cultivating unit when traveling across a headland. The side link actuators can likewise be used for raising purposes. Aside from active adjustment of the cultivating unit, the side link actuators, if they are designed, for example, as hydraulic cylinders, can also act as passive spring elements that allow the cultivating unit to adopt different height positions. They may also allow a transverse swinging motion of the cultivating unit.

In this embodiment, before being adjusted into the upright position, the cultivating unit is, at least in part, adjusted upwards relative to the boom from a lowered position into a raised position, specifically by adjustment of at least one of the links. The lowered position normally corresponds to a position in which the cultivating unit can take in crops from the ground. The raised position normally corresponds to a position in which the cultivating unit is at such a distance from the ground that it cannot take in any crops. This may be a headland position that is adopted when traveling across a headland. Altogether, the cultivating unit is, at least in part, adjusted upwards; that is to say, at least a part of the cultivating unit and/or its center of gravity is raised. The adjustment into the raised position and the adjustment into the upright position can be kinematically clearly distinguished from one another. Embodiments are, however, conceivable in which the adjustment of the cultivating unit from the lowered position via the raised position into the upright position takes place seamlessly.

The cultivating unit may be directly connected to the boom. In many cases, however, an indirect connection is advantageous. In a corresponding refinement, the cultivating unit is movably connected to a suspension frame, wherein the cultivating unit is adjusted into the upright position by virtue of the suspension frame being pivoted relative to the boom about the unit pivot axis. For example, the cultivating unit may be connected movably to the suspension frame via at least one guide element (for example, a link) and/or at least one actuator. In particular, the connection may be realized by the aforementioned middle link, the side links, and any associated actuators. The suspension frame is normally adjustable relative to the boom by actuator means. Adjustment of the suspension frame causes the cultivating unit to also be adjusted relative to the boom. Said cultivating unit is, however, additionally movably connected to the suspension frame, whereby, for example, a height adaptation and/or transverse swinging motion is possible in accordance with a ground profile. It is also possible for raising of the cultivating unit when traveling across a headland to be realized by adjustment, for example, pivoting, relative to the suspension frame and not by adjustment of the suspension frame relative to the boom.

The mobility of the cultivating unit relative to the suspension frame is normally somewhat disadvantageous during the adjustment into the transport position, because said mobility makes the present position of the cultivating unit more difficult to control during the adjustment. It is, therefore, preferred that the cultivating unit is locked on the suspension frame by actuator means before the suspension frame is pivoted about the unit pivot axis. This means that at least one actuator is used in order to lock the cultivating unit on the suspension frame. In particular, here, at least one linear actuator (for example, a hydraulic cylinder) may be adjusted into an end position. The corresponding end position, for example, a fully retracted position, is uniquely defined by the geometry of the linear actuator, and can be reliably adopted. In particular, the aforementioned middle link actuator and/or the side link actuators may be adjusted into an end position in order to lock the cultivating unit. The locking of the cultivating unit on the suspension frame may be performed by way of the aforementioned adjustment of the cultivating unit into the raised position.

Depending on the refinement and geometry of the cultivating unit and possibly of other components of the haymaking machine, the adjustment into the upright position may be implemented by way of a pivoting movement through different, possibly also relatively small angles. A pivoting movement through a relatively large angle is, however, preferred. Provision is typically made for each cultivating unit to be pivoted through an angle of between 70° and 120°, preferably between 75° and 115°, about the unit pivot axis. In some refinements, it can be stated that the cultivating unit is pivoted from an approximately horizontal position into an approximately vertical upright position.

The adjustability of the cultivating unit between the inner position and the outer position may be implemented in different ways. One refinement provides for each boom to have a pivoting portion, which is pivotably connected to the attachment region, and a sliding portion, which is slidably connected to the pivoting portion and on which the cultivating unit is arranged, wherein the adjustment of the cultivating unit between the inner position and the outer position is performed by translational sliding of the sliding portion on the pivoting portion. The sliding of the sliding portion on the pivoting portion can also be described, under some circumstances, as telescopic extension, and retraction. The cultivating unit is connected—for example, via the aforementioned suspension frame—to the sliding portion and is slid concomitantly as a result of the sliding movement of said sliding portion relative to the pivoting portion. The pivoting portion is, in turn, connected, pivotably about the boom pivot axis, to the attachment region. It is possible in this embodiment that, when the cultivating unit is in the inner position, part of the sliding portion projects inward beyond the attachment region.

The adjustment of the cultivating units into the inner position inherently contributes to a stabilization of the side unit and of the haymaking machine as a whole for the purposes of transport. It is nevertheless expedient for precautions to be taken, for example, in order to prevent a boom from undesirably pivoting outwards during transport. Such an outward pivoting movement could be caused, for example, by overloading or temporary failure of an actuator which affects the pivoting operation, and which is intended to hold the boom in the longitudinal position. One refinement, therefore, provides that the adjustment of the cultivating unit into the inner position gives rise to positive engagement between the side unit and the main frame, which positive engagement prevents the boom from pivoting out of the longitudinal position. Since the corresponding positive engagement is established by way of the adjustment of the cultivating unit, it can self-evidently also normally be released again only by way of an opposite adjustment of the cultivating unit, and not by a pivoting movement of the boom. The positive engagement may, in particular, exist, at least in part, in the direction of the transverse axis. The embodiment described here is particularly advantageous because two positive effects, specifically both the stabilizing arrangement of the cultivating unit and the locking of the boom, can be achieved by way of one single movement. Positive engagement may additionally be established in the direction of the vertical axis, whereby, for example, part of the weight of the side unit can be supported at this location by the main frame.

It would be conceivable for the boom to be secured on the main frame by way of the corresponding positive engagement, whilst the cultivating unit is, as it were, secured indirectly via the boom. This would, however, possibly still allow the cultivating unit, which has an at least similar and possibly even greater mass than the boom, to move relative to the boom, which could be disadvantageous, for example, under the action of lateral forces during a cornering maneuver. It is therefore preferred that a positive engagement is established between a first locking element, which is connected to the main frame, and a second locking element, which is connected to the cultivating unit. The first locking element may, in particular, be connected to an aforementioned drawbar. The second locking element is connected to the cultivating unit. Said second locking element is thus also connected to the boom, but only indirectly via the cultivating unit and possibly the aforementioned suspension frame. There are numerous possibilities with regard to the design of the two locking elements. The first guide element may form a type of guide profile for the second locking element, along which guide profile said second locking element is guided during the adjustment of the cultivating unit into the inner position. To minimize friction, the second locking element could also be designed as a roller that rolls on the first locking element.

One refinement provides for the haymaking machine to be designed as a windrower, and for each cultivating unit to be designed as a windrower unit which has a pickup device and a transverse conveyor device, wherein the pickup device is configured to pick up agricultural crops from the ground and transfer said crops to the transverse conveying device, and the transverse conveying device is configured to convey the transferred crops along the transverse axis and deposit said crops in the form of a windrow on the ground. Windrowers are provided for depositing crops, which are lying on the ground across an extensive area and/or in a randomly distributed fashion, in windrows. Such machines are also referred to as mergers.

Each windrower unit has those elements of the windrower which are intended to come into direct contact with the crops and transport said crops. Each windrower unit has a pickup device and, as a downstream device, a transverse conveying device. The pickup device, which can also be referred to as a pickup, generally has at least one rotor, which, by way of prongs, picks up the crops from the ground and conveys them in the direction of the transverse conveying device. It is also possible for two rotors to be provided: a pickup rotor for picking up the crops and a transfer rotor for transferring said crops to the transverse conveying device. In the working position, the transverse conveying device is arranged at least partially behind the pickup device with respect to the longitudinal axis. The pickup device transfers the crops to the transverse conveying device, which may also include the crops being thrown or allowed to fall. The transverse conveying device is configured to convey the transferred crops along the transverse axis, and deposit said crops in the form of a windrow on the ground. For this purpose, the transverse conveying device has a conveying element, generally a continuously circulating conveying element, for example, a conveyor belt or a link belt, wherein the term "belt windrower" may also be used. Said conveying element may form or have a conveying surface on which the crops are received. Normally, the transverse conveying device conveys the crops parallel to the transverse axis, though it could also convey said crops at a certain angle with respect to the transverse axis. Typically, with regard to the working position, the dimension of a windrower unit along the transverse axis is considerably greater (for example, at least three times greater) than that along the longitudinal axis. Furthermore, the dimension of said windrower unit along the longitudinal axis is normally greater than that along the vertical axis. The adjustment into the upright position thus makes it easier to achieve a space-saving arrangement in the transport position.

The invention furthermore provides a haymaking machine that has a main frame and two side units arranged to both sides on the main frame, each side unit having a boom, which in a side position extends sidewards along a transverse axis from an attachment region on the main frame, and a cultivating unit, arranged on the boom, for field cultivation, said cultivating unit being adjustable on the boom between an inner position arranged relatively close to the attachment region and an outer position that is further remote from the attachment region, wherein the haymaking machine is configured to carry out the following steps, proceeding from a working position in which the booms are in the side position that includes adjustment of each cultivating unit relative to the main frame into an upright position, at least in part by pivoting about in each case one unit pivot axis which, when the booms are in the side position, extends at least predominantly along the transverse axis, adjustment of the booms relative to the main frame, at least in part by pivoting about in each case one boom pivot axis, which extends at least predominantly along a vertical axis and is arranged in the attachment region, towards the longitudinal axis into a longitudinal position, wherein the adjustment of the booms is performed while the cultivating units are at least temporarily in the outer position, and adjustment of the cultivating units into the inner position after the adjustment of the booms has been at least performed at least partially.

The stated concepts have already been discussed above with reference to the method according to the invention. Advantageous embodiments of the haymaking machine according to the invention correspond to those of the method according to the invention.

The haymaking machine may be configured such that the stated steps are performed manually. Normally, the haymaking machine is configured to perform the steps by actuator means. In particular, said haymaking machine may be configured to carry out these (and optional further) steps automatically in a predetermined chronological sequence after a user, by way of an input, has initiated the adjustment into the transport position.

It is expressly pointed out that the above-described embodiments of the invention can be combined in each case individually, but also in any combinations with one another, with the subject matter of the main claim, provided that no technically compelling obstacles are in conflict therewith.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

The invention will be described below on the basis of figures. The figures are merely exemplary, and do not limit the general concept of the invention. In the figures:

Further modifications and embodiments of the invention can be derived from the following description of the subject matter and the drawings.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated. Further details and advantages of the invention can be found in the schematic figures described below.

The invention is described below with reference to figures. The figures are purely exemplary, and do not limit the general concept of the invention. More specifically.

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated. The hereinafter elucidated features may also be an aspect of the invention individually or in combinations other than those shown or described, but always at least in combination with the features of the claims. Where appropriate, functionally equivalent parts are provided with identical reference numbers.

Figure 1:
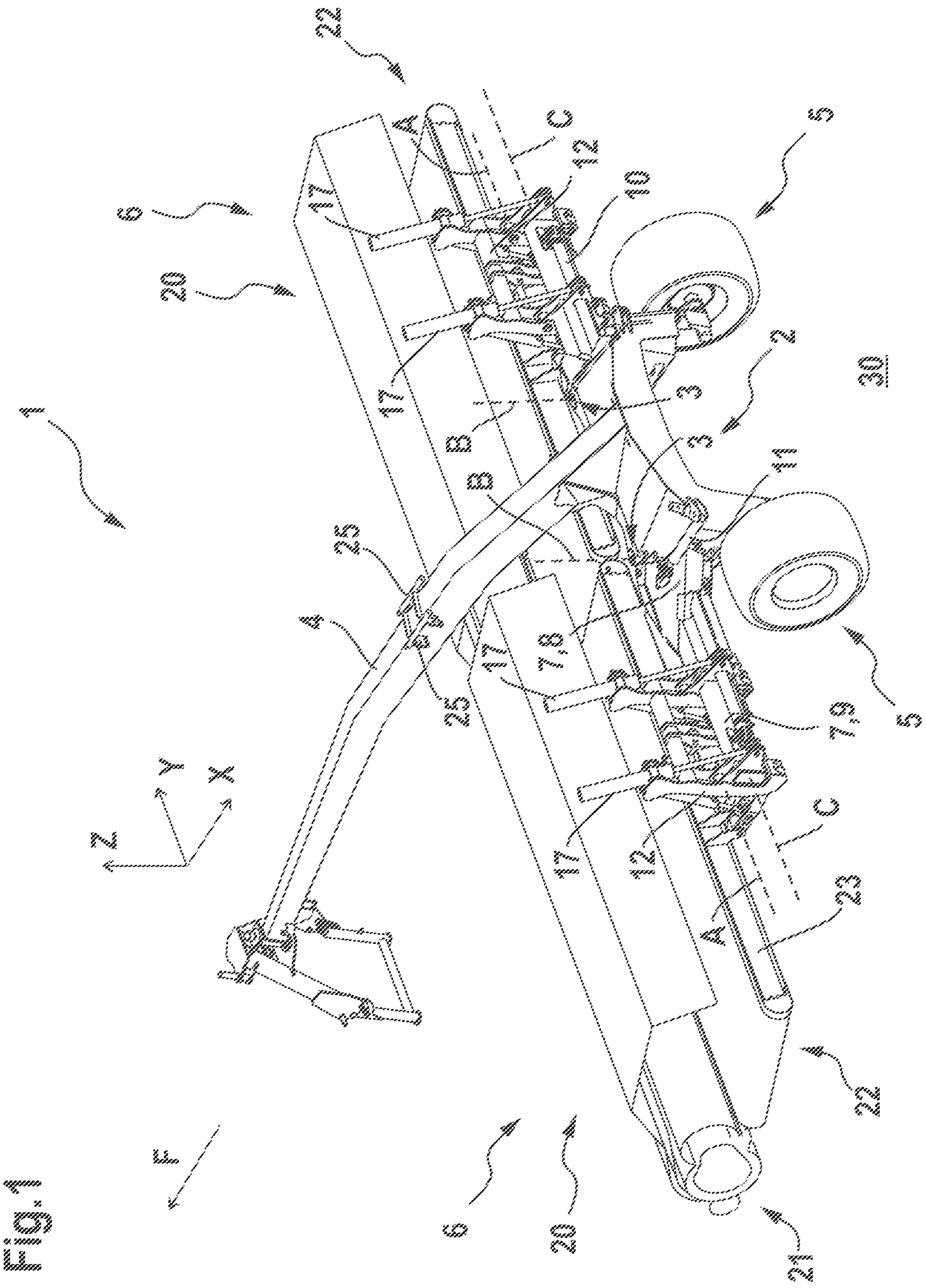
FIG. 1 shows a perspective view of a first haymaking machine according to the invention, configured as a windrower, in a working position with booms in a side position and windrower units in a lowered position and in an inner position.

FIG. 1 shows a haymaking machine according to the invention, in this case a windrower 1, which is provided for being towed by a tractor (not illustrated here). The windrower 1 has a main frame 2, which can be supported on the ground 30 via two wheels of a running gear 5. Furthermore, the main frame 2 has a drawbar 4, which points forwards in a direction of travel F and which extends along a longitudinal axis X and, via which said main frame is coupled to the tractor. Parallel to a transverse axis Y, two side units 6 are arranged to the two sides of the main frame 2, each side unit having a boom 7 on which a windrower unit 20, which serves as a cultivating unit, is arranged. Each boom 7 is connected to an attachment region 3 of the main frame 2 and, in a side position illustrated in FIGS. 1, 3, 4, and 5, extends sidewards along the transverse axis Y. The two windrower units 20 and their connection to the main frame 2 are identical or mirror-symmetrical, and therefore, only one windrower unit 20 will be considered in each case below.

Figure 3:
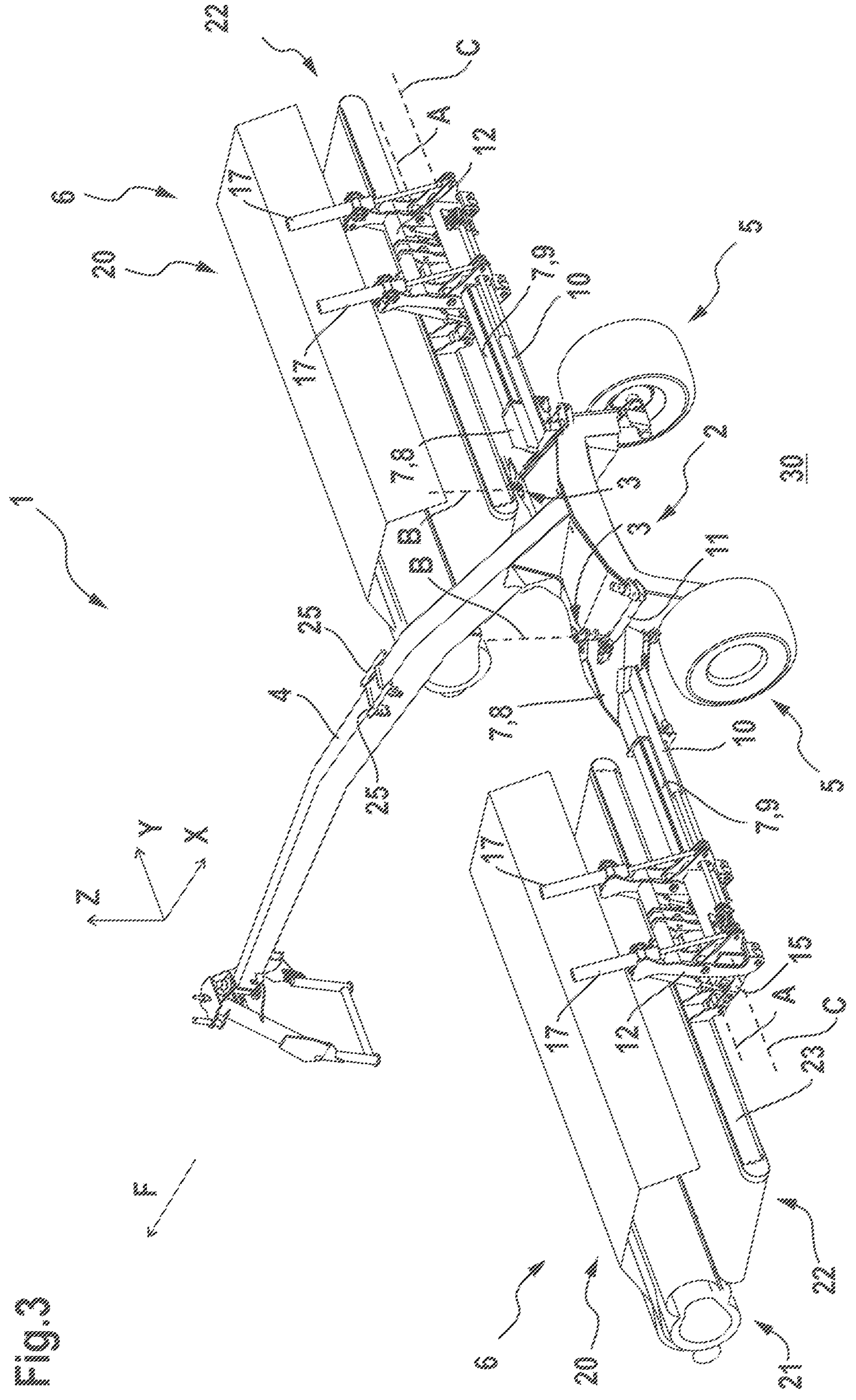
FIG. 3 shows a perspective view of the haymaking machine from FIG. 1 in a working position with the windrower units in the lowered position and in an outer position.
Figure 4:
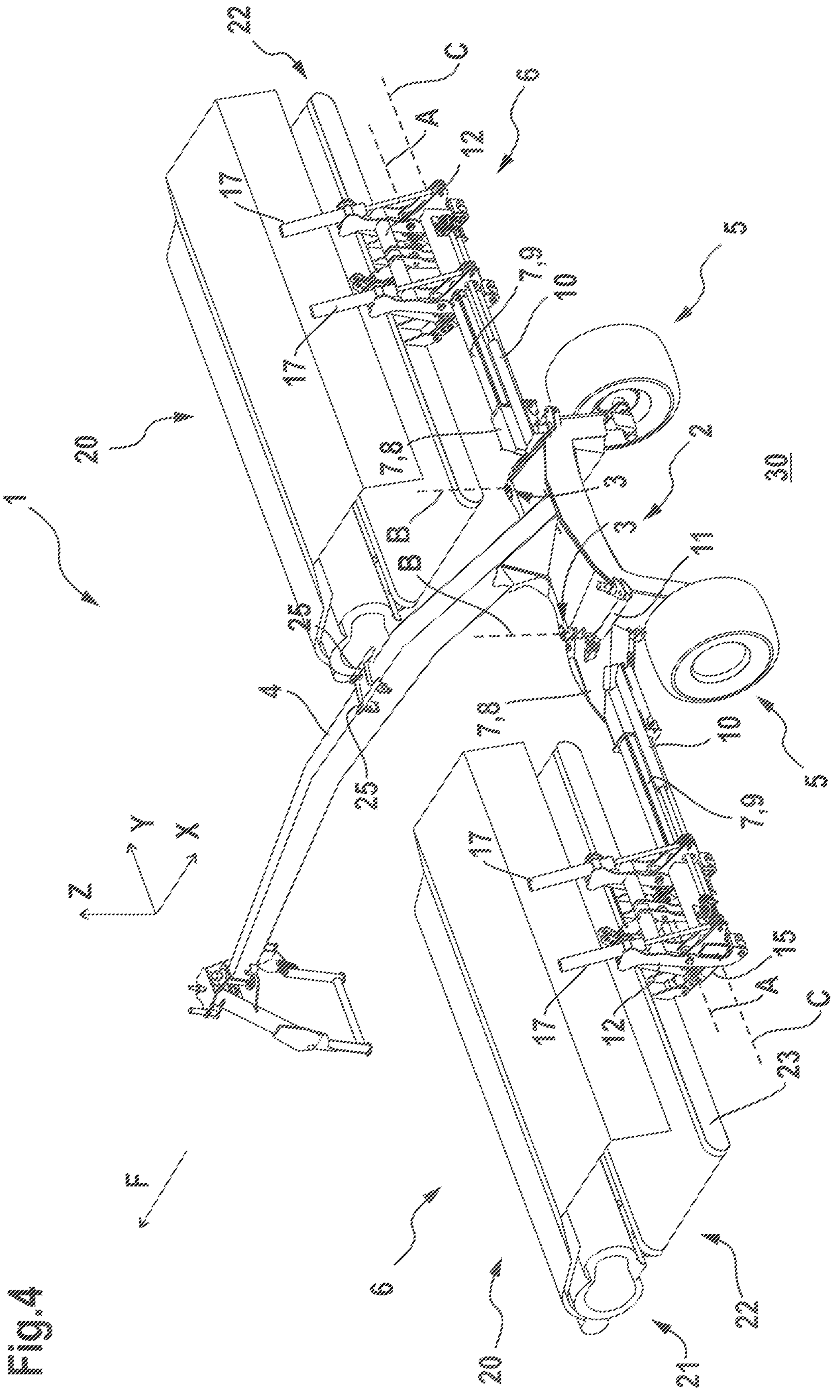
FIG. 4 shows a perspective view of the haymaking machine from FIG. 1 in a working position with the windrower units in a raised position and in an outer position.

The windrower unit 20 has a pickup device 21 and has a transverse conveying device 22 that is arranged behind said pickup device with respect to the longitudinal axis X. When the windrower 1 is towed in direction of travel F, the pickup device 21 picks up crops from the ground 30 and transfers said crops to the transverse conveying device 22, which conveys said crops sidewards with respect to the transverse axis Y by means of a conveyor belt (without reference designation) and deposits said crops in the form of a windrow on the ground 30. FIG. 1 shows a configuration of the windrower 1 that is provided for depositing the crops laterally to the outside with respect to the transverse axis Y. Here, the two windrower units 20 are arranged adjacent to one another along the transverse axis Y, and their conveyor belts are driven either in the same direction, for the purposes of depositing to one side, or in opposite directions, for the purposes of depositing to both sides. Alternatively, the windrower units 20 may also be arranged spaced apart from one another, as shown in FIG. 3, such that crops can (at least also) be deposited in the middle between the two windrower units 20.

In order to implement the different positions, each boom 7 has two portions 8, 9, specifically a pivoting portion 8, which is connected to the attachment region 3, and a sliding portion 9, which is slidably connected to the pivoting portion 8 and to which the windrower unit 20 is connected. By means of a slide actuator 10 that is designed here as a hydraulic cylinder, the sliding portion 9 with the windrower unit 20 can be adjusted along a sliding axis C. The windrower units 20 can thus be adjusted between an inner position illustrated in FIG. 1, in which they are arranged relatively close to the attachment region 3, and an outer position illustrated in FIG. 3, in which they are further remote from the attachment region 3. Each of the pivoting portions 8 is in turn connected to the attachment region 3 pivotably about a boom pivot axis B, which in this example is inclined with respect to the vertical axis Z by 5° in the direction of travel F toward the longitudinal axis X. Said pivoting portion can be actively pivoted by means of a pivoting actuator 11 designed as a hydraulic cylinder.

Figure 2:
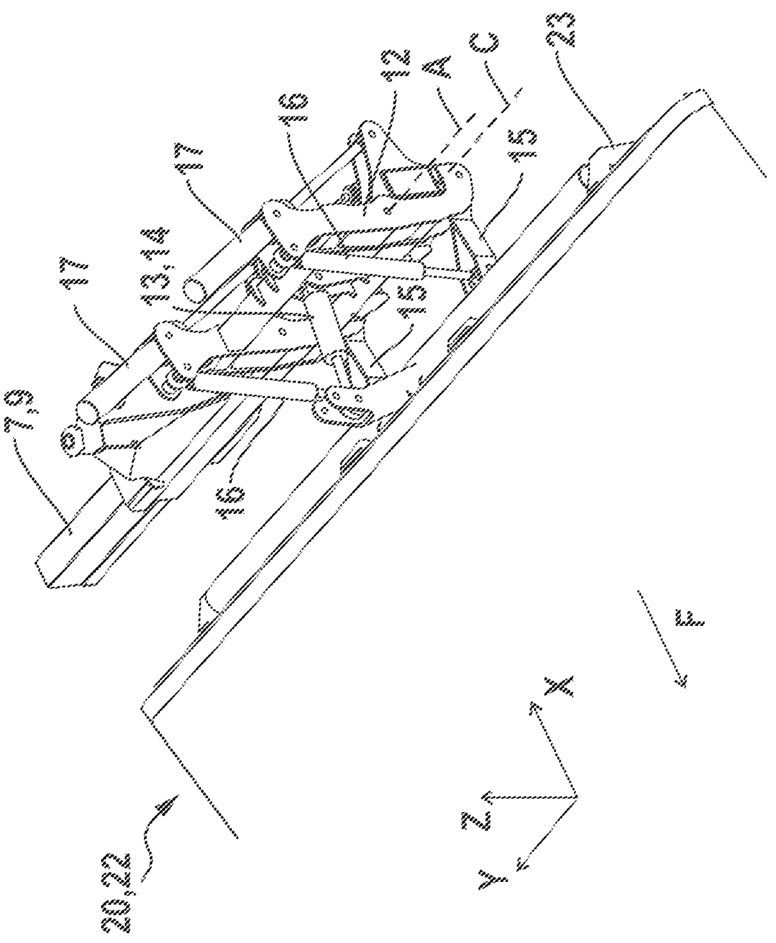
FIG. 2 shows a side view of a windrower unit of the windrower from FIG. 1.

As can be seen in particular in FIG. 2, the relevant windrower unit 20 is connected to the sliding portion 9 not directly but via an interposed suspension frame 12. The windrower unit 20 is, in turn, movably connected to the suspension frame 12. An inherently rigid windrower unit frame 23 of the windrower unit 20 is connected to the suspension frame 12 via an upper link 13, which is designed as an upper link actuator 14, and two lower links 15, which are offset laterally relative to said upper link along the transverse axis Y and which are arranged below said upper link with respect to the vertical axis Z. The upper link actuator 14, designed here as a hydraulic cylinder, is adjustable in length and is connected via pivot bearings (without reference designation) at one side to the suspension frame 12 and at the other side to the unit frame 23. The lower links 15 are likewise connected via pivot bearings to the unit frame 23 and to the suspension frame 12. Attached to each lower link 15 is a lower link actuator 16, which is likewise designed as a hydraulic cylinder, and which is pivotably connected to the lower link 15 and to the suspension frame 12.

By adjusting a length of the upper link 13, it is, for example, possible to adjust a working height of the windrower unit 20. Furthermore, the windrower unit 20 can be raised from a lowered position shown in FIGS. 1, 2, and 3 into a raised position shown in FIG. 4 by virtue of the upper link actuator 14 and the lower link actuators 16 being retracted. A raising movement for the purposes of traveling across a headland can, for example, be realized in this way. In the lowered position, the pickup devices 21 are arranged close enough to the ground that they can pick up crops. Furthermore, the lower link actuators 16 act as spring elements, which transmit part of the weight of the windrower unit 20 via the suspension frame 12 to the main frame 2. Owing to its passive articulation, the windrower unit 20 as a whole can be deflected upwards or downwards, for example, in order to follow a ground profile. By means of a different, that is to say, asymmetrical articulation of the two lower links 15 and an accompanying different compression and/or expansion of the lower link actuators 16, the windrower unit 20 can also perform a transverse swinging motion.

Figure 5:
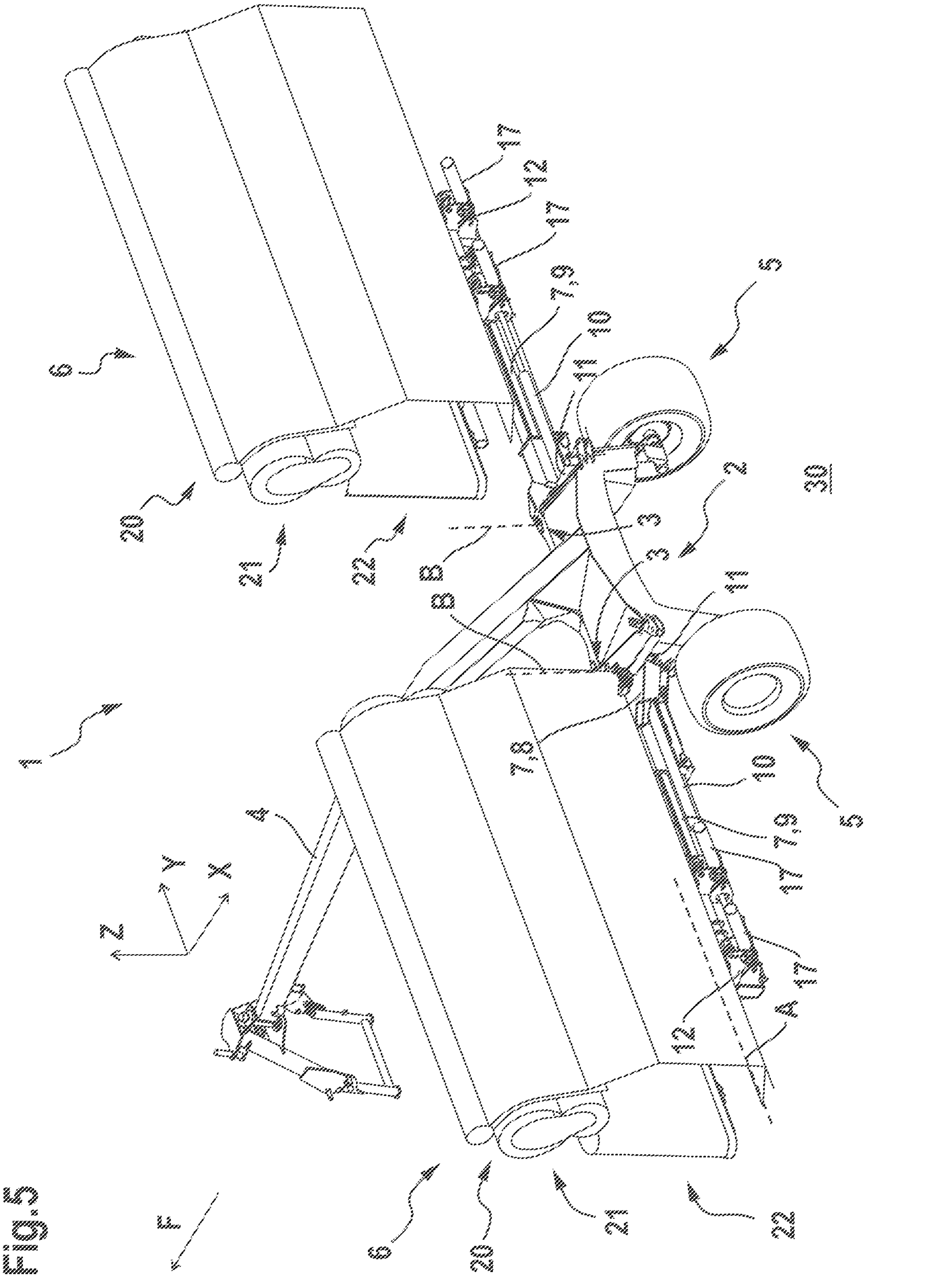
FIG. 5 shows a perspective view of the haymaking machine from FIG. 1 with the windrower units in an upright position.

The suspension frame 12 is, in turn, connected, pivotably about a unit pivot axis A, to the sliding portion 9 of the boom 7, and can be pivoted upwards, into an upright position, illustrated in FIG. 5, by means of two uprighting actuators 17.

The suspension of the windrower units 20 relative to the main frame 2 is also transferable to cultivating units of tedders or of mowing machines, which are designed as tedder units or as mowing units. The same applies to the method described below.

A method according to the invention for adjusting the windrower 1 into a transport position will now be discussed on the basis of FIGS. 1 and 3 to 9. The transport position is intended for transport of the windrower 1 to the location of use or for return transport from the location of use. FIG. 1 represents the initial state, in which the booms 7 are arranged in the side position and the windrower units 20 are arranged in the inner position and the in lowered position. Activation of the slide actuators 10 causes the sliding portions 9 with the windrower units 20 to be adjusted out of the inner position along the sliding axis C into the outer position shown in FIG. 3. In this case, the adjustment takes place parallel to the transverse axis Y. Before, during and/or after the adjustment of the windrower unit 20 into the outer position, the relevant windrower unit 20 is locked on the suspension frame 12 by virtue of both the upper link actuator 14 and the lower link actuators 16 being retracted into their relevant end position of minimum length. The windrower units 20 thus assume the raised position illustrated in FIG. 4.

In a next method step, the operating actuators 17 are actuated in order to pivot the suspension frame 12 with the windrower unit 20 arranged thereon upwards about the unit pivot axis A. In this example, pivoting takes place through an angle of approximately 90°, though this is to be understood merely as an example. In other refinements, the angle may, in particular, lie between 60° and 120°. As a result of the pivoting operation, the windrower units 20 assume the upright position illustrated in FIG. 5.

Figure 6:
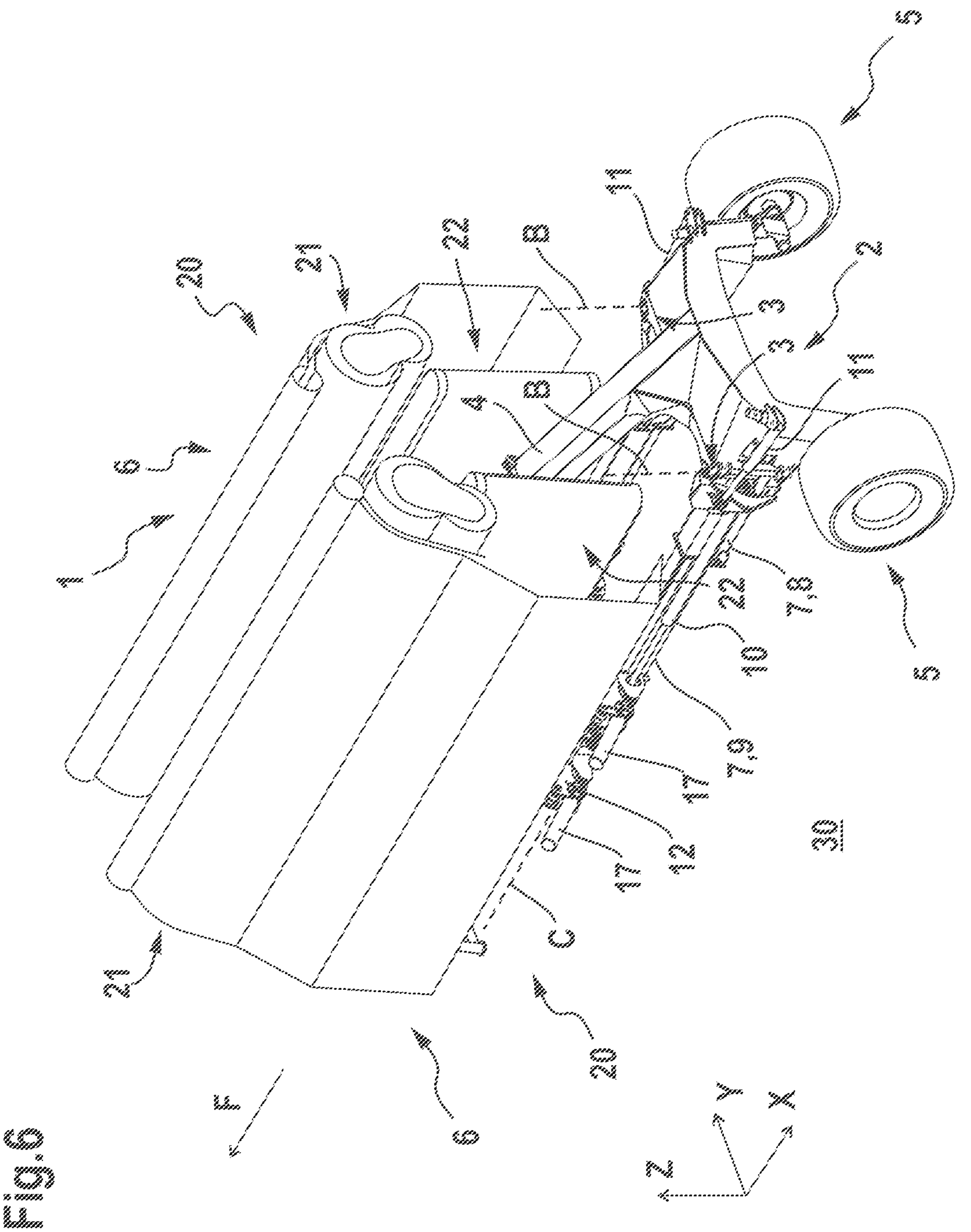
FIG. 6 shows a perspective view of the haymaking machine from FIG. 1 with the booms in a longitudinal position.
Figure 7:
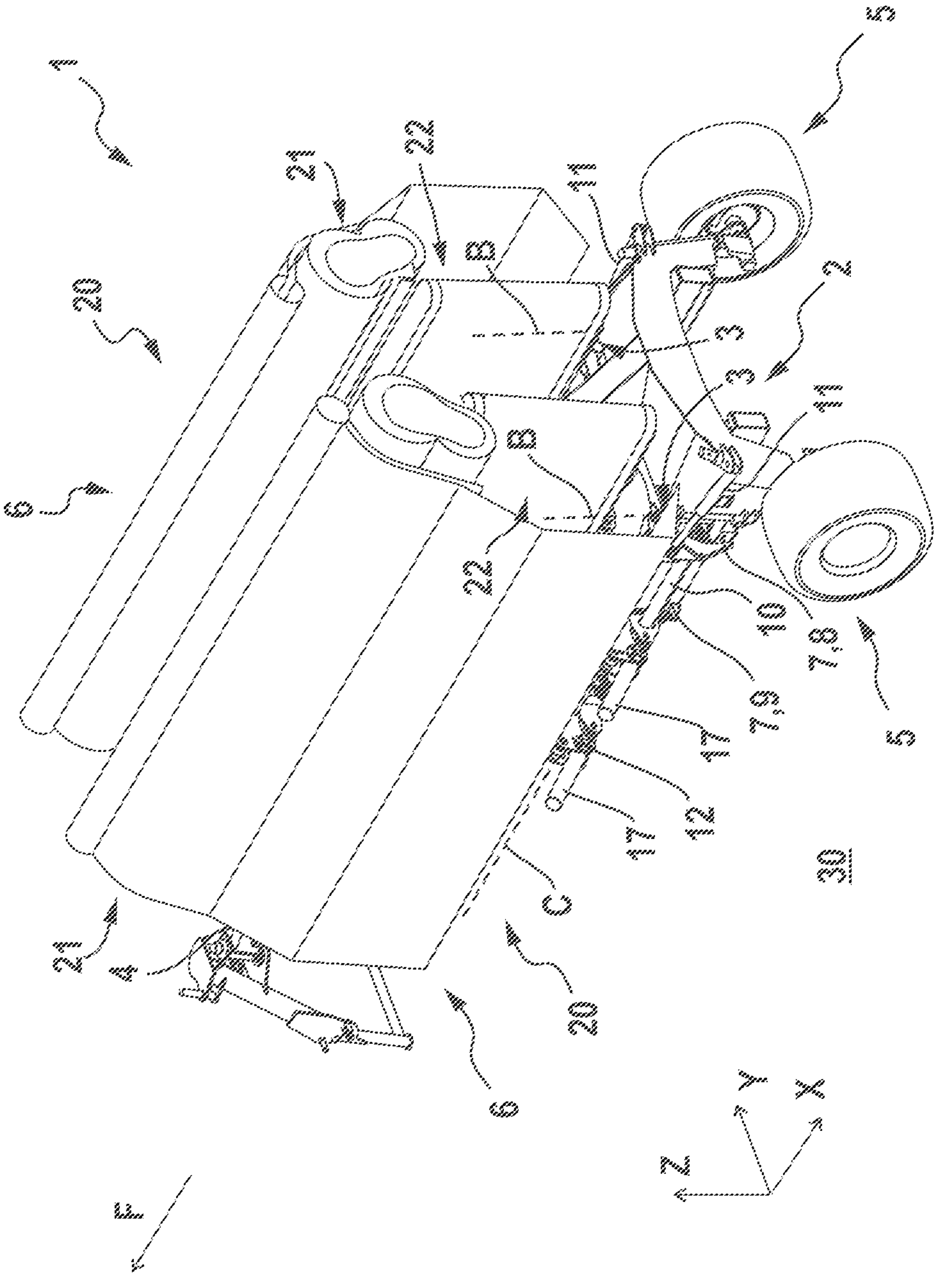
FIG. 7 shows a perspective view of the haymaking machine from FIG. 1 with the booms in a longitudinal position and the windrower units in the inner position.

In a next step of the method, the pivoting actuators 11 are activated, whereby the booms 7, proceeding from the side position, are pivoted forwards through an angle of approximately 90° in the direction of travel F and towards the longitudinal axis X until they assume the longitudinal position illustrated in FIG. 6. Here, the booms are arranged at a small distance from the drawbar 4 of the main frame 2 and from one another. Owing to the slight inclination of the boom pivot axes B with respect to the vertical axis Z, the pivoting movement also results in a downward shift of the center of gravity of the side units 6, whereby the center of gravity of the windrower 1 as a whole is also shifted downwards. The windrower units 20 are, however, still arranged in the outer position, which results in a high torque on the relevant boom 7 and an unfavorable mass distribution in relation to the running gear 5. For this reason, the two windrower units 20 are adjusted back into the inner position, whereby the windrower 1 assumes the transport position illustrated in FIG. 7.

Figure 9:
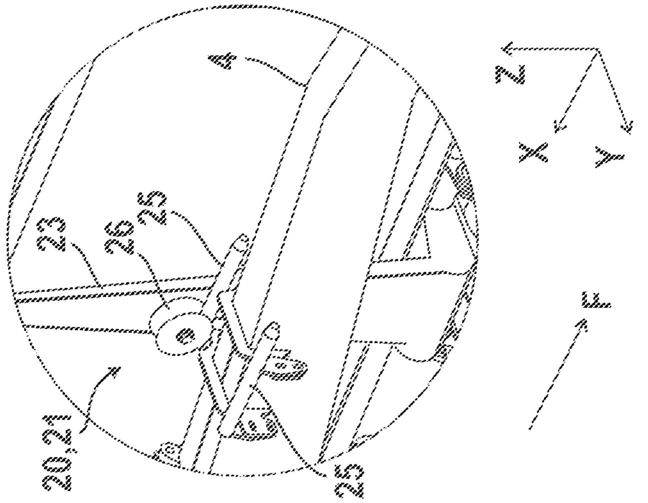
FIG. 9 shows a perspective detail view of the haymaking machine from FIG. 8 in a state corresponding to FIG. 7.
Figure 8:
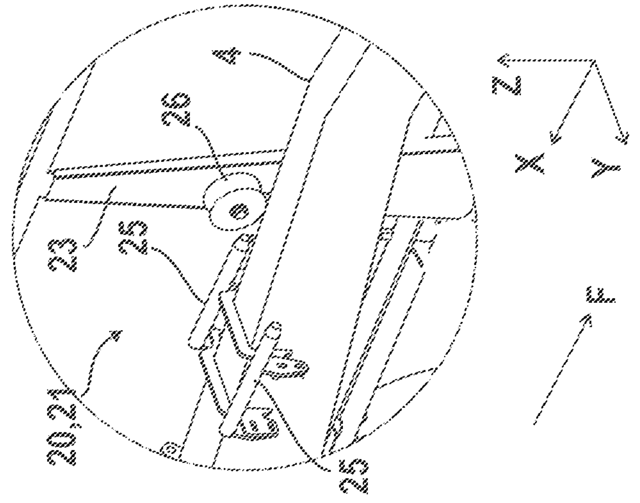
FIG. 8 shows a perspective detail view of the haymaking machine in a state corresponding to FIG. 6.

FIGS. 8 and 9 show detailed views of the windrower 1, which relates to a locking mechanism. As can also be seen in FIGS. 1 and 3, rail-like first locking elements 25 are rigidly connected to the drawbar 4. Furthermore, in each case one, second locking element 26, designed as a roller, is rotatably connected to the unit frame 23 of each windrower unit 20. With regard to the working position of the windrower 1 (as shown in FIGS. 1 and 3), the second locking element 26 is arranged on the underside of the windrower unit 20.

FIG. 8 corresponds to a state according to FIG. 6, wherein the booms 7 are arranged in the longitudinal position, and the windrower units 20 are arranged in the outer position. In this state, the two locking elements 25, 26 are not in contact with one another. This changes when the windrower units 20 are adjusted in the direction of the inner position. This results in the second locking element 26 coming into contact with the first locking element 25 and rolling over at the latter until, finally, the inner position of the windrower unit 20, shown in FIG. 9, is attained, which corresponds to FIG. 7. By means of an outer profile (not illustrated in detail here) of the second locking element 26, positive engagement is established in the direction of the transverse axis Y, which positive engagement prevents the booms 7 from pivoting out of the longitudinal position. Positive engagement is additionally established along the vertical axis Z by means of the locking elements 25, 26, whereby vertical forces, for example components of the weight force, can also be transmitted from the windrower unit 20 to the drawbar 4.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

| List of Reference Characters | |
|---|---|
| 1 | Windrower |
| 2 | Main frame |
| 3 | Attachment region |
| 4 | Drawbar |
| 5 | Running gear |
| 6 | Side unit(s) |
| 7 | Boom(s) |
| 8 | Pivoting portion(s) |
| 9 | Sliding portion(s) |
| 10 | Slide actuator(s) |
| 11 | Pivoting actuator(s) |
| 12 | Suspension frame |
| 13 | Upper link |
| 14 | Upper link actuator |
| 15 | Lower link(s) |
| 16 | Lower link actuator(s) |
| 17 | Uprighting actuator(s) |
| 20 | Windrower unit(s) |
| 21 | Pick-up device(s) |
| 22 | Transverse conveying device |
| 23 | Windrower unit frame |
| 25 | First locking element(s) |
| 26 | Second locking element(s) |
| 30 | Ground |
| A | Unit pivot axis |
| B | Boom pivot axis |
| C | Sliding axis |
| F | Direction of travel |
| X | Longitudinal axis |
| Y | Transverse axis |
| Z | Vertical axis |

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein, refers to slight variations in numerical quantities with respect to any quantifiable variable. Inadvertent error can occur, for example, through the use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes a structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

The invention claimed is:

1. A method for adjusting a haymaking machine (1) into a transport position, wherein the haymaking machine (1) includes a main frame (2) and two side units (6) arranged to both sides on the main frame (2), each side unit having a boom (7), which in a side position extends sidewards along a transverse axis (Y) from an attachment region (3) of the main frame (2), and a cultivating unit (20), arranged on the boom (7), for field cultivation, said cultivating unit (20) being adjustable on the boom (7) between an inner position arranged relatively close to the attachment region (3) and an outer position that is further remote from the attachment region (3), wherein, starting from a working position in which the booms (7) are in the side position, the following steps are performed comprising of:

- adjusting each cultivating unit (20) relative to the main frame (2) into an upright position, at least in part by pivoting about, in each case, one unit pivot axis (A) which, when the booms (7) are in the side position, extends at least predominantly along the transverse axis (Y);
- adjusting the booms (7) relative to the main frame (2), at least in part by pivoting about in each case one boom pivot axis (B), which extends at least predominantly along a vertical axis (Z) and is arranged in the attachment region (3), towards the longitudinal axis (X) into a longitudinal position, wherein the adjustment of the booms (7) is performed while the cultivating units (20) are at least temporarily in the outer position; and
- adjusting the cultivating units (20) into the inner position after the booms (7) have at least substantially been adjusted into the longitudinal position.

2. The method for adjusting a haymaking machine (1) into a transport position according to claim 1, further comprising adjusting the cultivating units (20) into the upright position before the booms (7) are adjusted into the longitudinal position.

3. The method for adjusting a haymaking machine (1) into a transport position according to claim 1, wherein the booms (7) are pivoted forwards in relation to a direction of travel (F).

4. The method for adjusting a haymaking machine (1) into a transport position according to claim 1, wherein the main frame (2) includes a drawbar (4) which extends forwards relative to the attachment region (3) with respect to the longitudinal axis (X) and towards which the booms (7) are pivoted into the longitudinal position.

5. The method for adjusting a haymaking machine (1) into a transport position according to claim 1, further comprising adjusting the cultivating units (20) into the outer position before the adjustment of the booms (7).

6. The method for adjusting a haymaking machine (1) into a transport position according to claim 1, further comprising adjusting each cultivating unit (20) into the upright position relative to the boom (7).

7. The method for adjusting a haymaking machine (1) into a transport position according to claim 1, wherein the cultivating unit (20) is connected at least indirectly to the boom (7) via a middle link (8) and two side links (10) which are laterally offset relative to said middle link along the transverse axis (Y) and which are at least partially vertically offset relative to said middle link along the vertical axis (Z), wherein the middle link (8) and the side links (10) are mutually independently pivotably connected on both sides, and wherein, before the cultivating unit (20) is adjusted into the upright position, the cultivating unit (20) is, at least in part, adjusted upwards relative to the boom (7) from a lowered position into a raised position by adjustment of at least one of the links (8, 10).

8. The method for adjusting a haymaking machine (1) into a transport position according to claim 1, wherein the cultivating unit (20) is movably connected to a suspension frame (12), and further comprising adjusting the cultivating unit (20) into the upright position by virtue of the suspension frame (12) being pivoted relative to the boom (7) about the unit pivot axis (A).

9. The method for adjusting a haymaking machine (1) into a transport position according to claim 8, wherein the cultivating unit (20) is locked on the suspension frame (12) by actuator means before the suspension frame (12) is pivoted about the unit pivot axis (A).

10. The method for adjusting a haymaking machine (1) into a transport position according to claim 1, wherein each cultivating unit (20) is pivoted through an angle of between 70° and 120° about the unit pivot axis (A).

11. The method for adjusting a haymaking machine (1) into a transport position according to claim 1, wherein each said boom (7) includes a pivoting portion (8), which is pivotably connected to the attachment region (3), and a sliding portion (9), which is slidably connected to the pivoting portion (8) and on which the cultivating unit (20) is arranged, wherein the adjustment of the cultivating unit (20) between the inner position and the outer position is performed by translational sliding of the sliding portion (9) on the pivoting portion (8).

12. The method for adjusting a haymaking machine (1) into a transport position according to claim 1, wherein adjusting the cultivating unit (20) into the inner position gives rise to positive engagement between the side unit (6) and the main frame (2), which positive engagement prevents the boom (7) from pivoting out of the longitudinal position.

13. The method for adjusting a haymaking machine (1) into a transport position according to claim 1 further comprising a positive engagement is established between a first locking element (25), which is connected to the main frame (2), and a second locking element (26), which is connected to the cultivating unit (20).

14. The method for adjusting a haymaking machine (1) into a transport position according to claim 1, wherein the haymaking machine (1) is designed as a windrower, and each cultivating unit (20) is designed as a windrower unit which has a pickup device (21) and a transverse conveyor device (22), wherein the pickup device (21) is configured to pick up agricultural crops from the ground (30) and transfer said crops to the transverse conveying device (22), and the transverse conveying device (22) is configured to convey the transferred crops along the transverse axis (Y) and deposit said crops in the form of a windrow on the ground (30).

15. A haymaking machine (1) comprising of:

- a main frame (2) and two side units (6) arranged to both sides on the main frame (2), each side unit having a boom (7), which in a side position extends sidewards along a transverse axis (Y) from an attachment region (3) of the main frame (2), and a cultivating unit (20), arranged on the boom (7), for field cultivation, said cultivating unit (20) being adjustable on the boom (7) between an inner position arranged relatively close to the attachment region (3) and an outer position that is further remote from the attachment region (3), wherein the haymaking machine (1) from a working position in which the booms (7) are in the side position can have each cultivating unit (20) adjust relative to the main frame (2) into an upright position, at least in part by pivoting about in each case one unit pivot axis (A) which, when the booms (7) are in the side position, extends at least predominantly along the transverse axis (Y) and the booms (7) adjustable relative to the main frame (2), at least in part by pivoting about in each case one boom pivot axis (B), which extends at least predominantly along a vertical axis (Z) and is arranged in the attachment region (3), towards the longitudinal axis (X) into a longitudinal position, wherein the booms (7) are adjustable while the cultivating units (20) are at least temporarily in the outer position, and the cultivating units (20) are adjustable into the inner position after the booms (7) have at least substantially been adjusted into the longitudinal position.

* * * * *